United States Patent [19]

Kasai et al.

[11] Patent Number: 5,057,725
[45] Date of Patent: Oct. 15, 1991

[54] ROTARY ELECTRIC MACHINE

[75] Inventors: Shigeru Kasai; Susumu Kobayashi; Makoto Fujishima, all of Komagane, Japan

[73] Assignee: Sankyo Seiki Mfg. Co., Ltd., Nagano, Japan

[21] Appl. No.: 456,301

[22] Filed: Dec. 26, 1989

[30] Foreign Application Priority Data

Dec. 27, 1988 [JP] Japan ............................ 63-168805[U]

[51] Int. Cl.$^5$ .............................................. H02K 5/24
[52] U.S. Cl. .................................. 310/51; 310/67 R; 310/181; 310/186; 310/258; 310/DIG. 6
[58] Field of Search ................ 310/51, DIG. 6, 67 R, 310/68 B, 181, 185, 186, 188, 193, 156, 254, 268, 261, 154, 258; 360/97.01, 97.02, 99.08, 99.11; 318/128

[56] References Cited

U.S. PATENT DOCUMENTS

| 4,135,119 | 1/1979 | Brosens | 310/128 |
| 4,683,505 | 7/1987 | Schmidt | 360/98.08 |
| 4,737,673 | 4/1988 | Wrobel | 310/67 R |
| 4,755,698 | 7/1988 | Frister | 310/51 |
| 4,839,546 | 6/1989 | Kitahara | 310/67 R |
| 4,891,537 | 2/1990 | Shiraki | 310/181 |

FOREIGN PATENT DOCUMENTS

| 2608689 | 9/1977 | Fed. Rep. of Germany | 310/51 |
| 2731818 | 2/1979 | Fed. Rep. of Germany | 310/181 |
| 0083447 | 6/1980 | Japan | 310/51 |

Primary Examiner—R. Skudy
Attorney, Agent, or Firm—McAulay Fisher Nissen Goldberg & Kiel

[57] ABSTRACT

A rotary electric machine comprising a stator and a rotor arranged oppositely of the stator. A magnet is provided on the stator or a frame for holding the stator at a position so as to be constantly opposed during rotation to a portion of the magnetic body of the rotor. The magnet is disposed at a position other than at a portion at which the magnetic action for rotation of the rotor occurs. The rotor is therefore constantly biased so that rotor play is minimized and non-repeatable deflections of the spindle are eliminated.

5 Claims, 5 Drawing Sheets

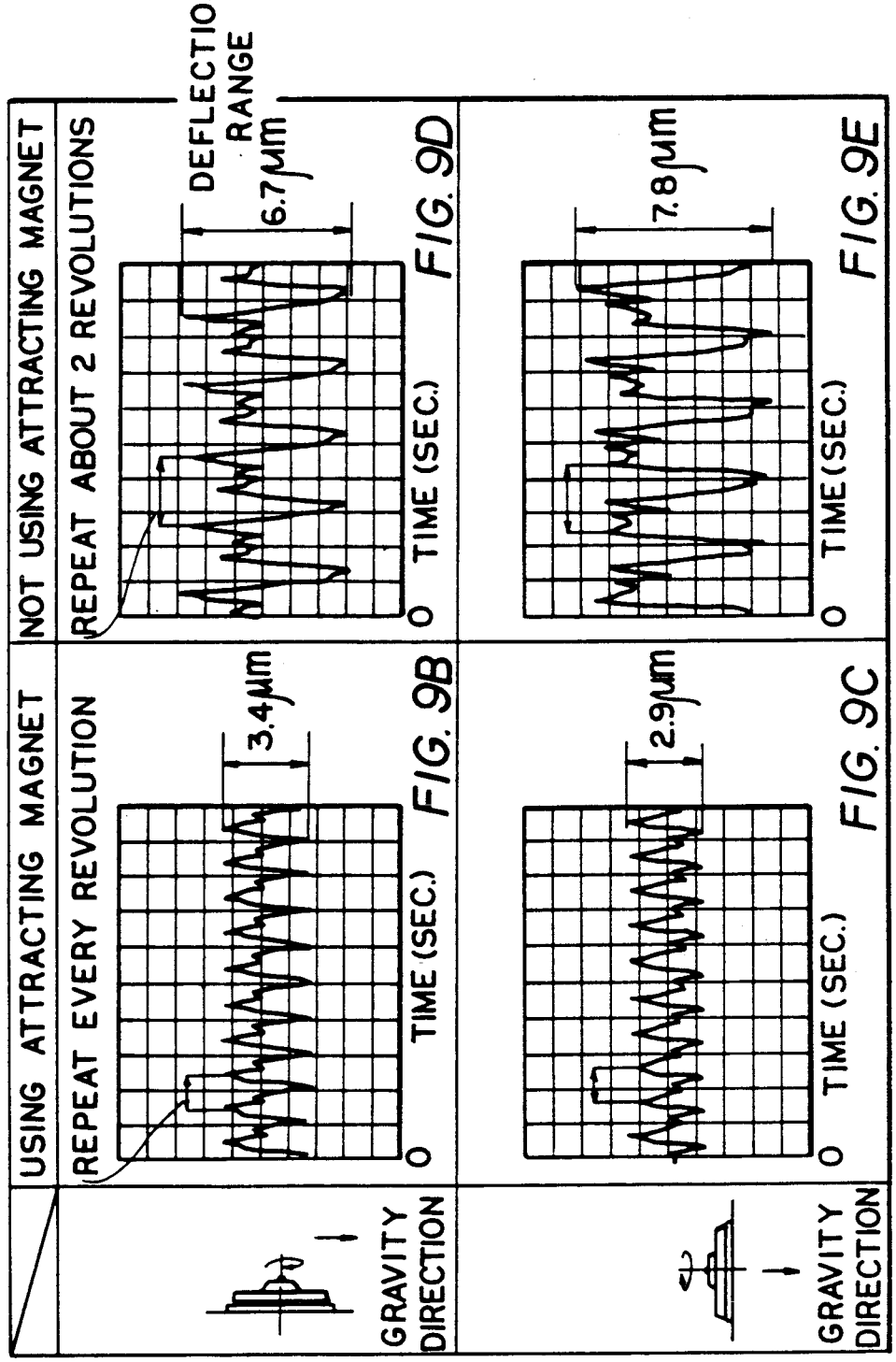

3,057,725

ROTARY ELECTRIC MACHINE

BACKGROUND OF THE INVENTION

1. Field of the Invention

The present invention relates to a rotary electric machine capable of suppressing a deflection, which can be used as a floppy disk drive, for example.

2. Description of the Prior Art

A rotary electric machine for a floppy disk drive as shown in FIG. 6 is known. In FIG. 6, a cylindrical bearing holder 10 is secured onto a frame 8 which also serves as a circuit substrate, and a stator core 7 is secured by fitting on the outer periphery of the bearing holder 10. The core 7 has a suitable number of poles, each having a drive coil 6 wound about it. The core 7 and the coil 6 constitute a stator. A spindle 4 is rotatably supported in the inner periphery of the bearing holder 10 by a pair of upper and lower metal bearings 5, 5. The lower end of the spindle 4 rests on a thrust receiver washer 9. A hub support 3 is secured by fitting to the upper end of the spindle 4 which projects from the upper end of the bearing holder 10. A center portion of a flat and cup-like rotor case 2 is secured by fitting onto the hub support 3 from underneath. The rotor case 2 is arranged to cover the stator portion. A ring-like drive magnet 1 is secured to the inner periphery of the rotor case 2, and the inner peripheral surface of the drive magnet 1 is spaced from and opposed to the outer peripheral surface of the stator core 7. The drive magnet 1, rotor case 2, hub support 3 and spindle 4 constitute a rotor. The rotor is arranged opposed to the stator and is rotatively driven by the magnetic action between the drive coil 6 constituting the stator and the aforesaid pole. The hub portion of the floppy disk is placed on the hub support 3 as is known and as the rotor rotates, the floppy disk also rotates.

According to the conventional rotary electric machine, since no radial force is applied to the rotor, a deflection occurs in the spindle 4 through a clearance between the metal bearings 5, 5 and the spindle 4 when the rotor rotates. The deflection of the spindle 4 is a random and non-repeatable deflection, which when used for the floppy disk drive, for example, results in a read error and a write error resulting from a track deflection of the floppy disk with respect to a transducer for a magnetic head or the like.

SUMMARY OF THE INVENTION

The present invention is characterized in that, in a rotary electric machine having a stator and a rotor arranged opposed to each other and rotated by magnetic action between the stator and the rotor, magnet means are provided at a fixed position in relation to the stator and coupled to a ferromagnetic portion of the rotor for constantly biasing the rotor in a predetermined radial direction whereby any wobble associated with the rotor is stabilized at a repeatable angular position.

In a preferred form of the invention, the magnet means is positioned to avoid substantially affecting the magnetic coupling between the stator and the rotor.

Thus, even if a clearance is present between the bearing and the rotational shaft of the rotor, the rotor will be attracted by the magnet means at a rotational fixed position, and the rotor will not have any play. The magnet means is provided at a position other than where magnetic action for rotating the rotor occurs, so that the rotation of the rotor is not affected thereby.

For a better understanding of the present invention, reference is made to the following description and accompanying drawings while the scope of the invention will be pointed out in the appended claims.

BRIEF DESCRIPTION OF THE DRAWINGS

In the drawings,

FIG. 9A illustrates an experimental arrangement for measuring play of the rotor, FIGS. 9B and 9C are graphical representations of spindle deflection range. When attracting magnet is employed and FIGS. 9D and 9E are graphical representations of spindle deflection range when no attracting magnet is employed.

DESCRIPTION OF THE PREFERRED EMBODIMENTS

Figure 1:
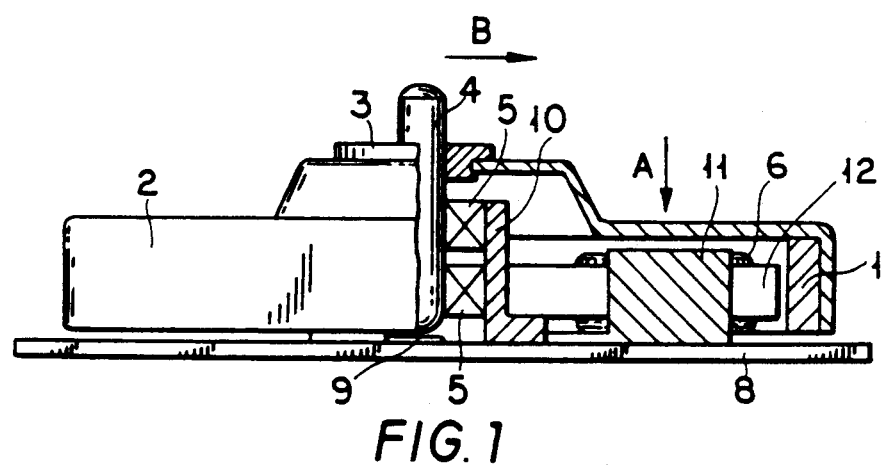
FIG. 1 is a front view partly in section showing one embodiment of a rotary electric machine according to the present invention.

Embodiments of the rotary electric machine according to the present invention will be described with reference to FIGS. to 5. The same component parts as those of the aforementioned prior art (FIG. 6) are indicated by the same reference numerals in FIGS. 1 to 5 and will not be further described.

Figure 2:
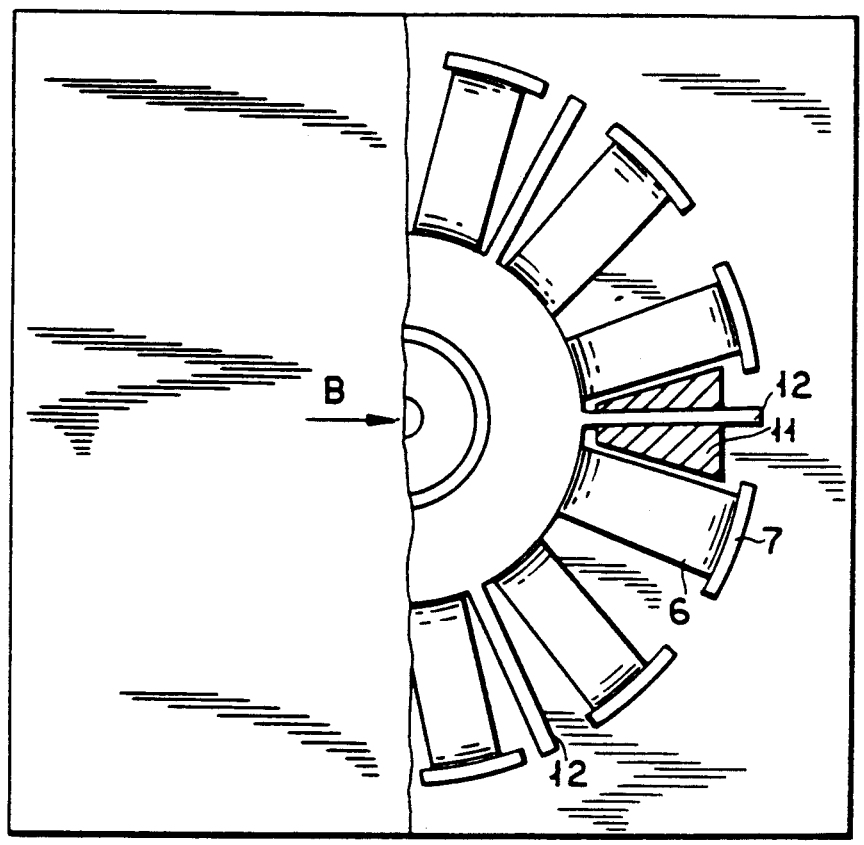
FIG. 2 is a plan view partly in section of the same construction as in FIG. 1.
Figure 3:
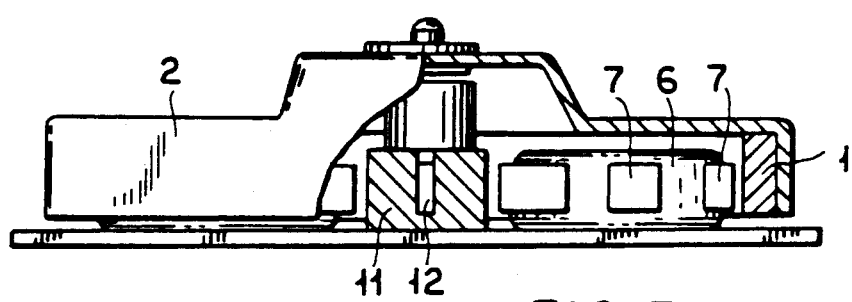
FIG. 3 is a side view partly in section of the construction of FIG. 1.

Referring to FIGS. 1 to 3, the stator core 7 has a plurality of poles at equal intervals in a peripheral direction with auxiliary poles 12 placed every two such poles. The poles and auxiliary poles 12 extend in a radial direction with each pole being wound with a drive coil 6. In a portion formed with one selected auxiliary pole 12 there is arranged and fixed a magnet 11 through which the selected auxiliary pole 12 extends so as to be located in a space formed between the auxiliary pole 12 and the poles on opposite sides. The magnet 11 is always opposed to a flat surface of the rotor case 2 which is a portion of the magnetic body of the rotor. The poles, the drive coil 6 and the drive magnet 1 on the rotor side constitute a portion at which a magnetic action for rotatively driving the rotor occurs. However, the magnet 11 is provided at a position other than at such portion at which the magnetic action occurs for the rotation of the rotor. Thus the magnet 11 forms magnet means which is provided at a fixed position (adjacent auxiliary pole 12) in relation to the stator and is magnetically coupled to a ferromagnetic portion (body) of the rotor. The stator and the rotor are otherwise constructed in accordance with the prior art.

According to the above-described embodiment, in the portion in which magnet 11 attracts the flat surface of the rotor case 2 opposed to the magnet 11 in a direction indicated by arrow A in FIG. 1. The lower end of the spindle 4 is located on the thrust receiver 9 so as to define movement in the thrust direction, whereas the flat surface of the rotor case 2 is attracted by the magnet 11 in the direction A so that the spindle 4 is urged, toward the metal bearings 5, 5 in the direction of arrow B (radial direction of the motor). Accordingly, the spindle 4 is always biased toward a fixed portion within the metal bearings 5, 5 and rotates at that position to suppress the deflection. Even if the spindle 4 is vibrated, this vibration will be a regular vibration but not a so-called repeatable vibration. Therefore, when it is used for rotation of a floppy disk, for example, it is possible to prevent an occurrence of a read error or a write error resulting from the track deflection of the floppy disk.

The magnet for always biasing the rotor may be provided on the stator or the frame for holding the stator, and may be provided at a position always opposed during rotation to the portion constituted by the magnetic body of the rotor and at a position other than at a portion at which the magnetic action for rotation of the rotor occurs. Various modified embodiments where these conditions apply will now be described.

Figure 4:
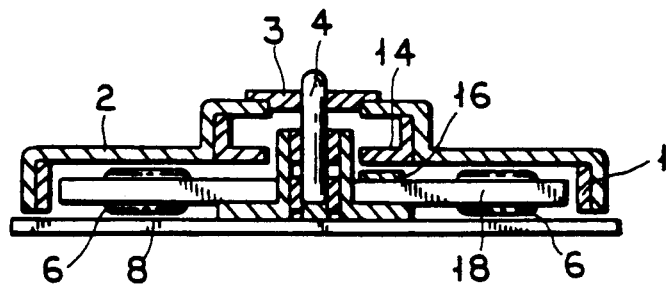
FIG. 4 is a front view in section showing a further embodiment of the rotary electric machine according to the present invention.

FIG. 4 shows a modified embodiment in which a ferromagnetic yoke 14 is provided as a magnetic body exclusively for producing an attractive force which is secured to the inner peripheral portion of a rotor case constituting a rotor. On the side of a stator 18, a magnet 16 is provided opposed to the yoke 14. Magnet 16 provides magnet means for providing an attractive force to the yoke 14 for deflecting the spindle to bias the rotor in a predetermined radial direction. As just mentioned, the magnetic body on the rotor side for always biasing the rotor toward the magnet may be a component part of the rotor itself or a separate part.

Figure 5:
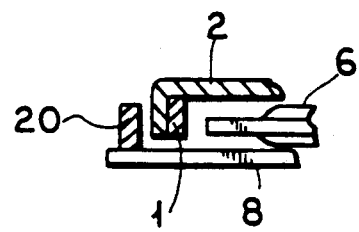
FIG. 5 is a front view in section showing essential parts of another embodiment of the rotary electric machine according to the present invention.
Figure 6:
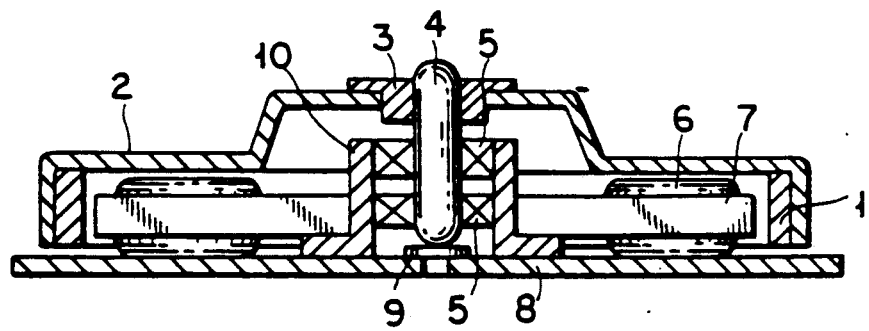
FIG. 6 is a front view in section showing an example of a conventional rotary electric machine.
Figure 7C:
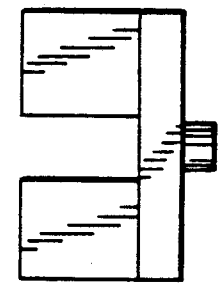
FIGS. 7A, 7B and 7C are top front and side views, respectively, of an attracting magnet in accordance with the present invention.
Figure 7A:
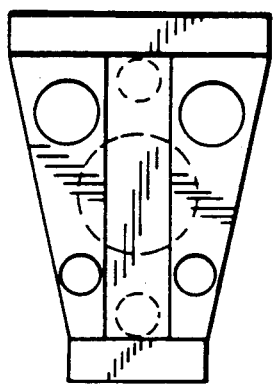
Figure 7B:
Figure 8B:
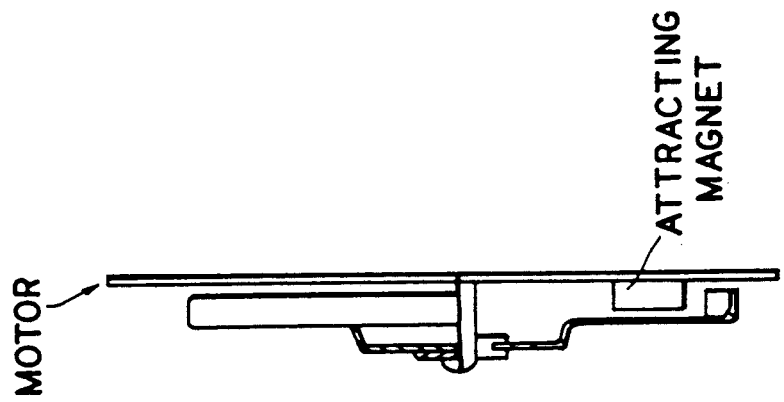
FIGS. 8A and 8B are top and side views, respectively, of a motor in accordance with the present invention showing the placement of the magnet in one embodiment.
Figure 8A:
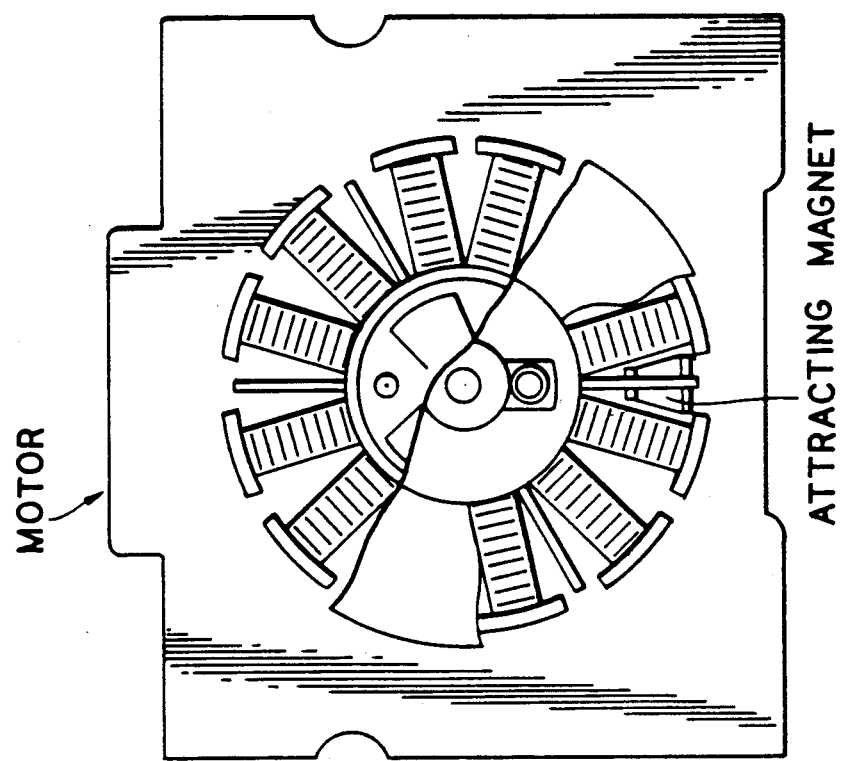

FIG. 5 shows a further modified embodiment in which a magnet 20 for always biasing a rotor is provided on a circuit substrate 8 as a frame for holding a stator, and an outer peripheral surface of the rotor case 2 is attracted by the magnet 20. In this manner, the magnet for constantly biasing the rotor may be provided externally of the rotor. The magnet is not always provided by use of the auxiliary poles of the stator core as previously mentioned but for example, the magnet may be secured by adhesives to a portion at which no auxiliary pole is present or may be secured by screws. In this arrangement, magnet 20 provides magnet means which is mounted on the circuit substrate for attracting an outer peripheral surface of the rotor case to bias the rotor in a predetermined radial direction.

One example of the construction of an attracting magnet for a specific rotary electric machine or motor is shown in FIGS. 7A-C and 8A-B. As shown in the top view of FIG. 7A, the magnet is approximately 9 mm in length by 6.6 mm in width having the shape illustrated. The main magnet body is 4.1 mm in height. The magnet is placed in the stator area of a motor having the dimensions indicated in FIGS. 8A and 8B. The attracting force of such magnet in this example is 15-17 g.

Referring now to FIGS. 9A-9E, graphical measurements of spindle deflection are presented where a magnet according to the present invention is employed and where no such magnet is employed. The measurement method is shown in FIG. 9A. There a non-contact detector 30 senses the deflection of the spindle. The output of the detector is supplied to an analyzer 31 and graphical representations of the spindle deflection are recorded. In FIG. 9B, measurement is made of a motor where the spindle is placed at 90° to the gravity direction. The measured spindle deflections are consistent and repeat every revolution. The measured peak-to-peak deflection is 3.4 $\mu$m. In FIG. 9C, with the spindle oriented in the gravity direction, again, the deflections were consistent and were repeated every revolution with a measured peak-to-peak deflection of 2.9 $\mu$m.

The measurements for the prior art construction are shown in FIGS. 9D and 9E, FIG. 9D with the spindle at 90° to the gravity direction and FIG. 9E with the spindle in the gravity direction. Note that in FIG. 9E, the deflections are not repeatable and are erratic. While more repeatable in FIG. 9D, in both FIGS. 9D and 9E the repeatability is about every two revolutions. The peak-to-peak deflections are substantially greater, being about 6.7 $\mu$m in FIG. 9D and about 7.8 $\mu$m in FIG. 9E.

The major improvement of the present invention is fully substantiated by the measurements shown and described.

According to the present invention, the rotor is constantly biased by the magnet in order to attract the rotor and to cause the rotor to rotate at a fixed position. The deflection is suppressed. Even if deflection occurs, it will be a regular deflection but not a so-called non-repeatable deflection. Therefore, for example, even if the machine is used for rotation of the floppy disk, it is possible to prevent an occurrence of a read error or a write error resulting from the track deflection of the floppy disk.

While the foregoing description and drawings represent the preferred embodiments of the present invention, it will be obvious to those skilled in the art that various changes and modifications may be made therein without departing from the true spirit and scope of the present invention.

What is claimed is:

1. In a rotary electric machine having a stator and a rotor arranged opposed to each other and rotated by magnetic action between the stator and the rotor, the improvement comprising: magnet means provided at a fixed position in relation to the stator and magnetically coupled to a ferromagnetic portion of said rotor for constantly biasing said rotor in a predetermined radial direction, said magnet means being positioned to avoid substantially affecting magnetic coupling between the stator and rotor, whereby any wobble associated with rotation of said rotor is stabilized at a repeatable angular position.

2. The rotary electric machine of claim 1, wherein said rotor includes a rotor case, said rotor being mounted on a spindle extending through said case, said magnet means being secured to a portion of said stator to provide an attractive force on said case for deflecting said spindle so as to bias said rotor in said predetermined radial direction.

3. The rotary electric machine of claim 1, including a frame for holding said stator, said magnet means being secured to said stator frame.

4. The rotary electric machine of claim 1 wherein said rotor includes a rotor case, said rotor being mounted on a spindle extending through said case, and a ferromagnetic yoke, said yoke being secured to an inner peripheral portion of said rotor case and wherein said magnet means opposed to said yoke is secured to said stator, said magnet means providing an attractive force to said yoke for deflecting said spindle so as to bias said rotor in said predetermined radial direction.

5. The rotary electric machine of claim 3 wherein said rotor includes a rotor case and wherein said frame for holding said stator, is a circuit substrate, said magnet means being mounted on said circuit substrate for attracting an outer peripheral surface of said rotor case so as to bias said rotor in said predetermined radial direction.

* * * * *